United States Patent [19]

Valenti

[11] Patent Number: 4,800,989

[45] Date of Patent: Jan. 31, 1989

[54] PORTABLE OUTDOORSMAN'S SEAT

[76] Inventor: Andrew Valenti, 277 Laclede Ave., Uniondale, N.Y. 11553

[21] Appl. No.: 205,377

[22] Filed: Jun. 10, 1988

[51] Int. Cl.⁴ .......................... A45F 3/26; A01M 31/02
[52] U.S. Cl. .................................... 182/187; 297/118; 297/217
[58] Field of Search ................ 182/187, 188; 108/152; 297/217, 118, 255

[56] References Cited

U.S. PATENT DOCUMENTS

| | | | |
|---|---|---|---|
| 2,549,679 | 4/1951 | Foote | 182/187 |
| 2,847,059 | 8/1958 | Klins | 182/187 |
| 4,315,655 | 2/1982 | Machnik | 182/187 |
| 4,397,500 | 8/1983 | Moffitt | 182/187 |
| 4,445,591 | 5/1984 | Mitchell | 182/187 |
| 4,553,635 | 11/1985 | Johnson | 182/187 |
| 4,605,097 | 8/1986 | Maxwell | 182/187 |
| 4,705,143 | 11/1987 | Ziemba | 182/187 |
| 4,759,425 | 7/1988 | Turner | 182/187 |

Primary Examiner—Reinaldo P. Machado
Attorney, Agent, or Firm—Hoffmann & Baron

[57] ABSTRACT

A outdoorsman's seat comprising a rigid rectangular seat member having canted opposed slots in its longitudinal edges to receive two limbs of a supporting line adapted to be secured to two spaced apart trees. The opposed inclined slots result in a resultant force vector which holds the seat more tightly and securely with increased weight but nevertheless affords easy sliding movement of the seat along the limbs as well as attachment and detachment therefrom.

6 Claims, 1 Drawing Sheet

U.S. Patent	Jan. 31, 1989	4,800,989
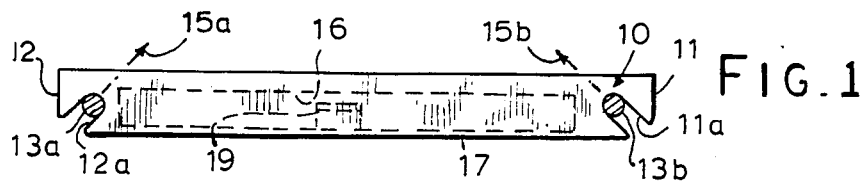
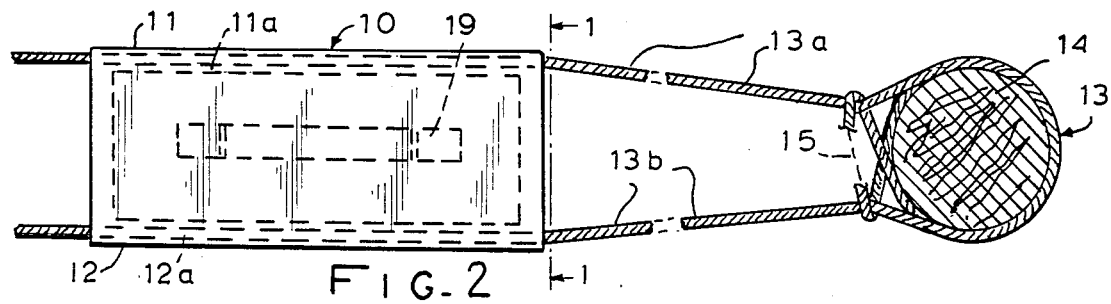
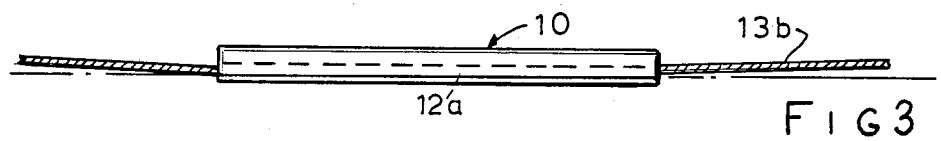
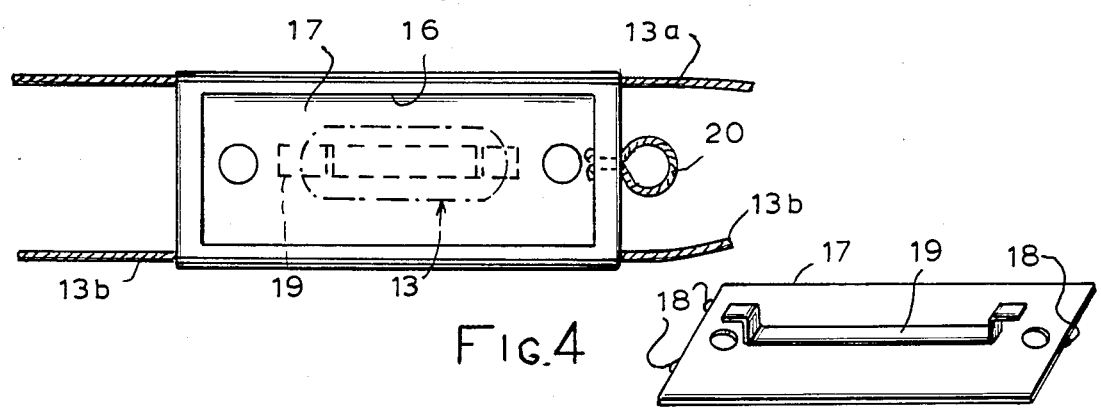
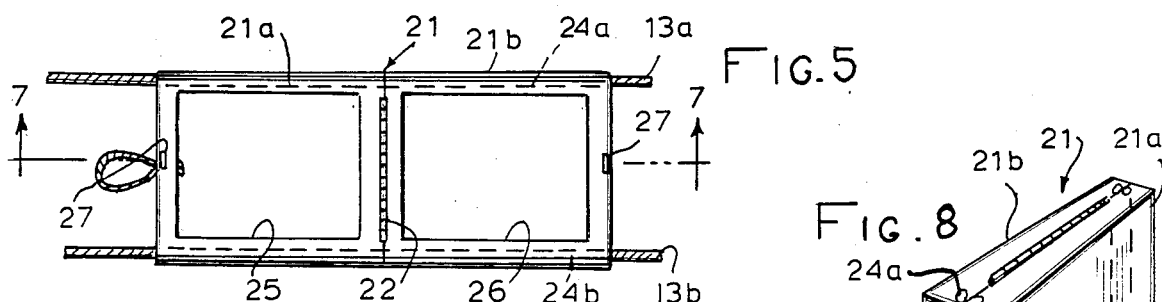
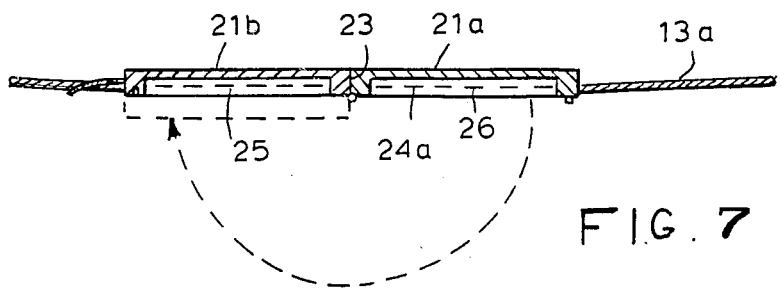
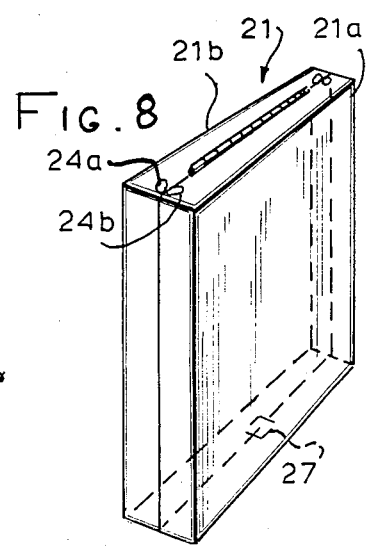

PORTABLE OUTDOORSMAN'S SEAT

BACKGROUND OF THE INVENTION

This invention relates to outdoorsman's seats.

Portable outdoorsman's seats come in a wide range of designs and configurations. Their utility depends in large part on their portability, stability, durability and convenience of mounting. A particular advantage for an outdoorsman's seat is its ability to be quickly shifted into position to achieve a range of critical sight lines from a single set up.

The present invention has for its object to meet all of the above design criteria.

BRIEF DESCRIPTION OF THE INVENTION

In accordance with the invention, there is provided a outdoorsman's seat formed of relatively inflexible, durable material which is adapted to be rigid in its mounted configuration. The seat portion can, if desired, be formed of two or more articulated sections joined by hinge means enabling it to be folded for portability and in the process to define a storage chamber for flexible support lines adapted to be secured to random trees or other supports. The seat is rectangular in configuration and is formed along its two longitudinal edges with slots dimensioned to receive the support lines snugly. The slots are inclined from the lower portion of the seat upwardly and inwardly at opposing angles. The support line is adapted to be strung between two trees to form two parallel spaced apart limbs. The seat is snapped onto the forward and rearward limbs so that opposed resultant forces at angles to the vertical and horizontal are established against the seat for stability. The seat can then be slid along the length of the support lines as designed to select sight lines. The weight of the person on the seat only serves to increase the stability of attachment of the seat to its support lines.

BRIEF DESCRIPTION OF THE DRAWINGS

FIG. 1 is a view of a mounted outdoorsman's seat in cross section and in enlarged scale taken on the line 1—1 of FIG. 2 looking in the direction of the arrows;

FIG. 2 is a top view of the outdoorsman's seat movably and detachably mounted on its support lines and showing the support lines secured at one end to a tree;

FIG. 3 is a side view of the outdoorsman's seat of FIG. 2;

FIG. 4 is a top view of the outdoorsman's seat corresponding to FIG. 2 but broken away to reveal the lower storage compartment;

FIG. 5 is a view in perspective of a cover portion for the storage chamber formed in the seat for the support lines when not in use;

FIG. 6 is a bottom view of another embodiment of the invention;

FIG. 7 is a view in cross section taken on the line 7—7 of FIG. 6; and,

FIG. 8 is a view in perspective of the seat of FIG. 6 shown in its folded configuration.

DESCRIPTION OF THE PREFERRED EMBODIMENTS

Referring to FIGS. 1 and 2, the invention is illustrated as embodied in a seat portion 10 preferably formed of a rigid material such as wood or plastic to preclude significant bending. Each of the longitudinal edges 11 and 12 is formed with an inclined slot 11a and 12a inclining inwardly and upwardly at a angle of approximately 45 degrees. The width of the slots 11a and 12a corresponds approximately to the diameter of a support line 13 adapted to be strung between two trees, one of which is illustrated and identified by the numeral 14 in FIG. 2. The two free ends of the line 13 are, after wrapping around the tree 14, knotted at the point 15. The corresponding support tree is not illustrated, but it will be understood that the line 13 is looped once or twice about the trunk to secure the position. As best seen in FIG. 1, the two limbs 13a and 13b of the line 13 seat in the inclined slots 11a and 12a to impose resultant angled forces upward and inward as indicated by the force vectors 15a and 15b. In this fashion, the seat portion 10 is captured by the limbs 13a and 13b even with the seat unweighted. The weight of a person on the seat serves to increase the anchoring forces and to stabilize the seat against detachment from its supporting line 13.

It will be understood that the unweighted seat can be slid along the length of the limbs 13a and 13b to achieve any desired sight line for the person. Also, the seat portion 10 can be quickly and easily detached from its support line and reattached at another point as desired.

The underside of the seat portion 10 is formed with a storage chamber 16 for the support line 13. A reversible cover portion 17 (FIG. 4) is provided for the opening to the storage space 16 with suitable latching elements 18 being provided to hold the cover in place. The underside of the cover 17 carries a wrapping cleat 19 around which the support line 13 can be wound for convenient storage. When seat is not in use, the cover 17 is placed so the support rope 13 is in the interior storage space. When seat is in use, the cover 17 is placed with cleat 19 outward to provide a convenient form for rewinding the rope after which the cover 17 can be reversed. A carrying thong 20 is affixed to one end of the seat portion 10 (to be attached to the user's belt, a mounting clip or a utility hook). In this fashion there is provided a portable, sturdy and versatile outdoorman's seat which is reliable in its operation and which enables the person with minimum effort to attach to the support lines over any one of a range of positions.

Referring to FIGS. 6-8, another embodiment of the invention is disclosed in which the seat portion 21 is formed of two articulated portions 21a and 21b joined by a hinge 22 with the abutment line 23 between the two seat portions being arranged to establish a longitudinally rigid seat when mounted on the support line 13. Inclined or canted grooves 24a and b are provided along the lengths of the forward and rearward longitudinal edge corresponding to the slots 11a and 12a of FIG. 1. Each of the sections 21a and 21b is formed with a storage compartment 25 and 26, respectively, which meet when the unit is folded together as shown in FIG. 8 to form one enlarged compartment for storage of the line 13. Fasteners 27 are provided for holding the unit in its closed position.

While the invention has been described having preferred embodiments thereof, it will be understood that it contains other forms and arrangements within the scope of the invention and should not therefore be regarded as confined except as to the following claims.

I claim:

1. A portable outdoorsman's seat adapted for suspension on a pair of forward and rearward flexible support lines adapted to be secured to randomly laterally spaced apart supports, comprising, a generally flat and rectangular seat portion formed of inflexible material and having sufficient bending strength to support a seated person when mounted on the support lines, said seat portion having slots formed adjacent its respective forward and rearward longitudinal edges, each slot being inclined inwardly and upwardly to receive the lines and to provide opposed upwardly inclined supporting force vectors against the seat, thereby to constrain the support lines to remain engaged in the slots under a range of supported weights and a range of angles for the support lines relative to the seat and to allow the seat both to be slid laterally on the support lines or to be snapped onto the strung lines at selected points.

2. An outdoorsman's seat as set forth in claim 1, said seat portion being formed with a line storage chamber.

3. A outdoorsman's seat as set forth in claim 2, said seat portion being articulated to fold at least in half, said storage chamber for the lines being adapted to be closed by folding the seat portion.

4. A outdoorsman's seat as set forth in claim 2, said seat portion comprising a single rigid member with the storage chamber being formed in the bottom and a detachable cover portion for the chamber.

5. A outdoorsman's seat as set forth in claim 4 including cleats carried by the cover portion about which to wind the support line for storage.

6. An outdoorsman's seat as set forth in claim 5 in which the cover portion is reversibly positionable on the seat for exposing the cleats for winding the lines and for positioning the cleats and lines in the storage chamber.

* * * * *